(12) United States Patent
Ishida

(10) Patent No.: US 9,375,982 B2
(45) Date of Patent: Jun. 28, 2016

(54) MOTORCYCLE TIRE FOR RUNNING ON ROUGH TERRAIN

(75) Inventor: Shingo Ishida, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 1043 days.

(21) Appl. No.: 13/529,323

(22) Filed: Jun. 21, 2012

(65) Prior Publication Data

US 2013/0014868 A1    Jan. 17, 2013

(30) Foreign Application Priority Data

Jul. 13, 2011    (JP) .................................. 2011-155076

(51) Int. Cl.
| | | |
|---|---|---|
| B60C 11/11 | (2006.01) | |
| B60C 11/03 | (2006.01) | |
| B60C 11/13 | (2006.01) | |

(52) U.S. Cl.
CPC ............... *B60C 11/11* (2013.01); *B60C 11/033* (2013.04); *B60C 11/1369* (2013.04); *B60C 11/1376* (2013.04); *B60C 11/1384* (2013.04); *B60C 2200/10* (2013.04); *B60C 2200/14* (2013.04)

(58) Field of Classification Search
CPC ............ B60C 2200/10; B60C 2200/14; B60C 2200/12; B60C 11/0318; B60C 11/1376; B60C 11/1384; B60C 11/1392; B60C 11/1369; B60C 11/033; B60C 11/0332; B60C 11/11

USPC ............... 152/209.11, 209.12, 209.15, 209.3, 152/209.4; D12/536, 571
See application file for complete search history.

(56) References Cited

U.S. PATENT DOCUMENTS

| | | | | |
|---|---|---|---|---|
| 4,311,179 A | * | 1/1982 | Hayakawa | .............. B60C 11/11 |
| | | | | 152/209.11 |
| 2005/0173036 A1 | * | 8/2005 | Rossignaud | ........ B60C 11/0311 |
| | | | | 152/209.11 |
| 2008/0110541 A1 | | 5/2008 | Sueishi | |
| 2013/0042952 A1 | * | 2/2013 | Stuckey et al. | ......... B60C 11/11 |
| | | | | 152/209.12 |

* cited by examiner

*Primary Examiner* — Michael H Wilson
*Assistant Examiner* — Philip N Schwartz
(74) *Attorney, Agent, or Firm* — Birch, Stewart, Kolasch & Birch, LLP

(57) ABSTRACT

A motorcycle tire for running on rough terrain comprises a tread portion provided with a plurality of blocks defining a block pattern. The blocks include center blocks whose centroids of their top surfaces are disposed within a center region of the tread portion defined as being centered on the tire equator and having a developed width of 25% of a developed tread width. The top surface of each of the center blocks is provided with an axially extending edge extending straight and parallel with the tire axial direction, and arc edges curved convexly toward the centroid of the top surface and disposed on both sides of the axially extending edge in the tire axial direction.

10 Claims, 6 Drawing Sheets

MOTORCYCLE TIRE FOR RUNNING ON ROUGH TERRAIN

BACKGROUND OF THE INVENTION

The present invention relates to a pneumatic tire, more particularly to a motorcycle tire for running on rough terrain having an improved tread pattern capable of improving traction and braking performance during straight running.

Motorcycle tires for running on rough terrain for example used in motocross races are provided with block patterns in order to improve performance during running on soft grounds such as sand and mud, and usually, the tread center region is provided with blocks whose top surface is generally rectangular in order to improve traction and braking performance during straight running.

In such a motorcycle tire however, when running straight on relatively hard rough terrain, wandering from side to side is liable to occur due to undulation of the ground and frictional resistance against the ground because the blocks can not dig into the relatively hard ground sufficiently, which also causes a problem of insufficient traction and braking performance.

SUMMARY OF THE INVENTION

It is therefore, an object of the present invention to provide a motorcycle tire for running on rough terrain in which traction and braking performance during straight running can be improved.

According to the present invention, a motorcycle tire for running on rough terrain comprises a tread portion provided with a plurality of blocks defining a block pattern, the blocks include center blocks whose centroids of their top surfaces are disposed within a center region of the tread portion defined as being centered on the tire equator and having a developed width of 25% of the developed tread width between the tread edges, and the top surface of each of the center blocks is provided with an axially extending edge which extends straight and parallel with the tire axial direction and a pair of arc edges which are curved convexly toward the centroid of the top surface and disposed on both sides of the axially extending edge in the tire axial direction.

Therefore, by the arc edges, the ground pressure of the top surface of the center block is increased near the axially extending edge in comparison with a rectangular top surface, and accordingly, the center block can dig into the ground more, and the traction and braking performance during straight running and the wandering can be improved.

The motorcycle tire according to the present invention may be further provided with the following optional features:

the axial length of the axially extending edge is 26 to 46% of the maximum axial width of the top surface, and the arc edges each have a radius of curvature which is 22 to 42% of the maximum circumferential length of the top surface;

the center blocks include a plurality of tied center block groups each consisting of at least two axially arranged center blocks each connected to the next with a tie bar, and the tied center block groups are arranged circumferentially of the tire at intervals so that at least one group always exists in the ground contacting patch of the tire during running;

the blocks further include shoulder blocks whose centroids of their top surfaces are within shoulder regions defined as extending toward the tire equator from the respective tread edges and each having a developed width of 12.5% of the developed tread width, and middle blocks whose centroids of their top surfaces are within middle regions of the tread portion defined between the center region and the shoulder regions;

each of the top surfaces of the middle blocks and the shoulder blocks is provided with an axially inside circumferentially extending edge which extends straight and parallel with the tire circumferential direction on its tire equator side, and a pair of arc edges which are curved convexly toward the centroid on both sides of the axially inside circumferentially extending edge in the tire circumferential direction;

the circumferential length of the axially inside circumferentially extending edge of the middle block is 27 to 47% of the maximum circumferential length of the top surface of the middle block, and the arc edges of the middle block each have a radius of curvature of 22 to 42% of the maximum axial width of the top surface of the middle block;

the middle blocks in each of the middle regions are arranged circumferentially of the tire so that their centroids are disposed at least two different axial positions;

the axial distance from the tire equator to the centroid of each of the middle blocks is 38 to 68% of one half of the developed tread width;

with respect to the circumferential positions of the centroids of the middle blocks, the middle blocks in one of the middle regions are respectively aligned with the middle blocks in the other middle region so that the angle of a straight line drawn between the centroids of the aligned middle blocks is not more than 10 degrees with respect to the tire axial direction;

the circumferential length of the axially inside circumferentially extending edge of the shoulder block is 26 to 46% of the maximum circumferential length of the top surface of the shoulder block, and the arc edges of the shoulder blocks each have a radius of curvature of 29 to 49% of the maximum axial width of the top surface of the shoulder block;

with respect to the circumferential positions of the centroids of the shoulder blocks, the shoulder blocks in one of the shoulder regions are respectively aligned with the shoulder blocks in the other shoulder region so that the angle of a straight line drawn between the centroids of the aligned shoulder blocks is not more than 8 degrees with respect to the tire axial direction.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure is the maximum air pressure specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. If no standard is available, a wheel rim recommended by the tire manufacturer and a maximum air pressure specified by the tire manufacturer are used.

The above-mentioned developed tread width means a distance measured perpendicularly to the tire equator from one of the tread edges to the other along the tread surface.

DESCRIPTION OF EMBODIMENTS

Embodiment of the present invention will now be described in detail in conjunction with the accompanying drawings.

Figure 1:
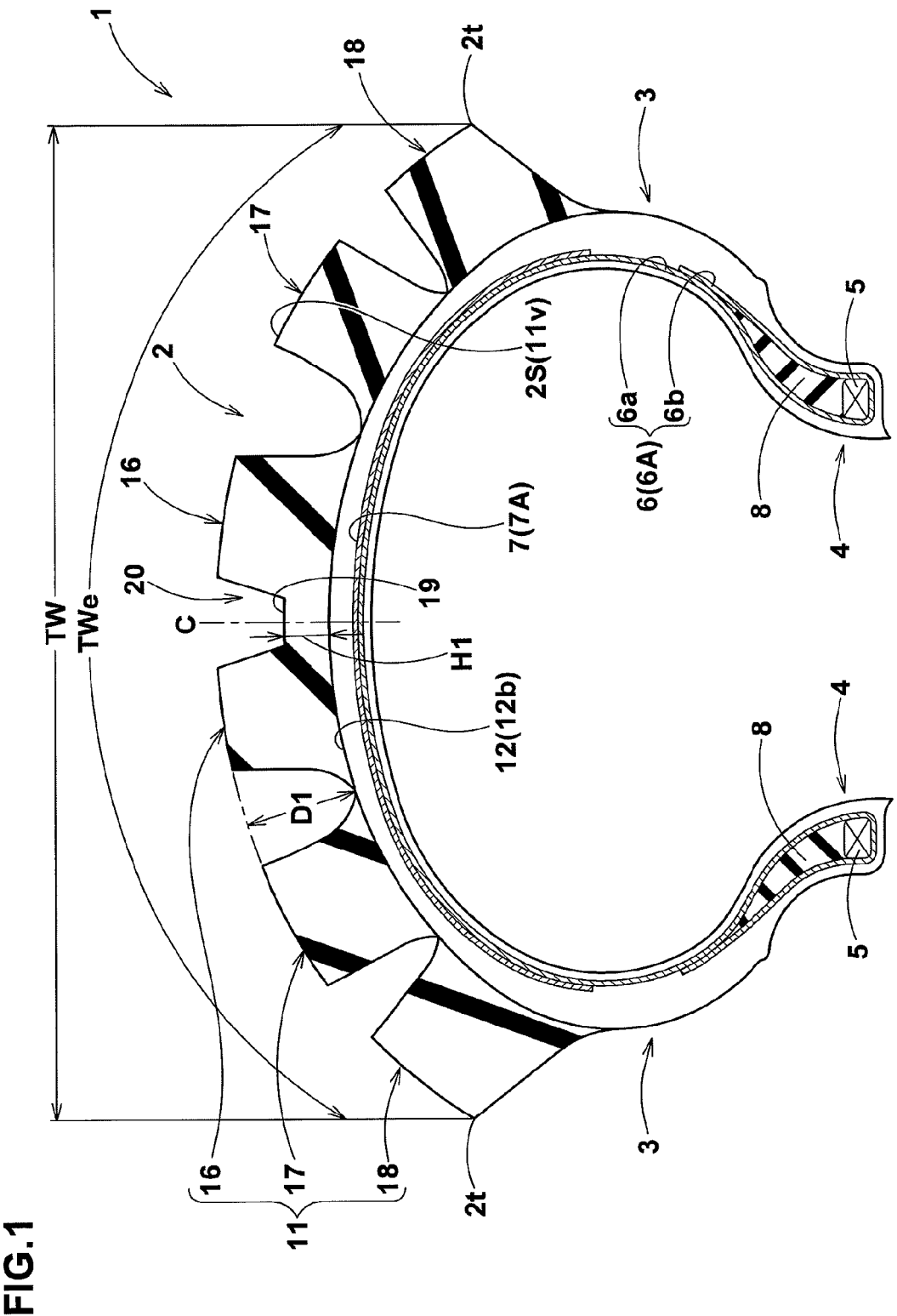
FIG. 1 is a cross sectional view of a motorcycle tire for running on rough terrain according to an embodiment of the present invention taken along line A-A of FIG. 2.

According to the present invention, as shown in FIG. 1, a motorcycle tire 1 comprises a tread portion 2, a pair of sidewall portions 3, a pair of bead portions 4 each with a bead core 5 therein, a carcass 6 extending between the bead portions 4 through the tread portion 2 and sidewall portions 3, and a tread reinforcing layer 7 disposed radially outside the carcass 6 in the tread portion 2.

As a characteristic of a motorcycle tire, the tread portion 2 is convexly curved so that the tread face between the tread edges 2t is curved like an arc swelling radially outwardly, and the maximum cross sectional width of the tire 1 occurs between the tread edges 2t, namely, equals to the axial tread width TW.

In this embodiment, the motorcycle tire 1 is designed to exert its excellent performance when running on soft grounds such as sand and mud and also relatively hard grounds such as dry earthen road and thus it is suitable for use in a motocross race.

The carcass 6 is composed of at least one carcass ply 6A, in this embodiment only one carcass ply 6A, extending between the bead portions 4 through the tread portion 2 and sidewall portions 3, and turned up around the bead core 5 in each of the bead portions 4 so as to form a pair of turned up portions 6b and a main portion 6a therebetween. For the carcass cords, organic fiber cords such as nylon, polyester, rayon and the like can be used. In the case of the solo carcass ply 6A as in this embodiment, a radial ply made of organic fiber cords arranged at an angle of from 75 to 90 degrees with respect to the tire circumferential direction can be used. However, it is also possible to use a bias ply carcass composed of two or more carcass plies each made of carcass cords arranged at an angle of from 15 to 45 degrees with respect to the tire circumferential direction.

In each of the bead portions 4, between the carcass ply main portion 6a and turned up portion 6b, there is disposed a bead apex 8 made of hard rubber extending radially outwardly in a tapered manner from the bead core.

The tread reinforcing layer 7 is composed of at least one ply, in this embodiment only one ply 7A, of organic fiber cords laid at an angle of 15 to 45 degrees with respect to the tire circumferential direction.

Figure 2:
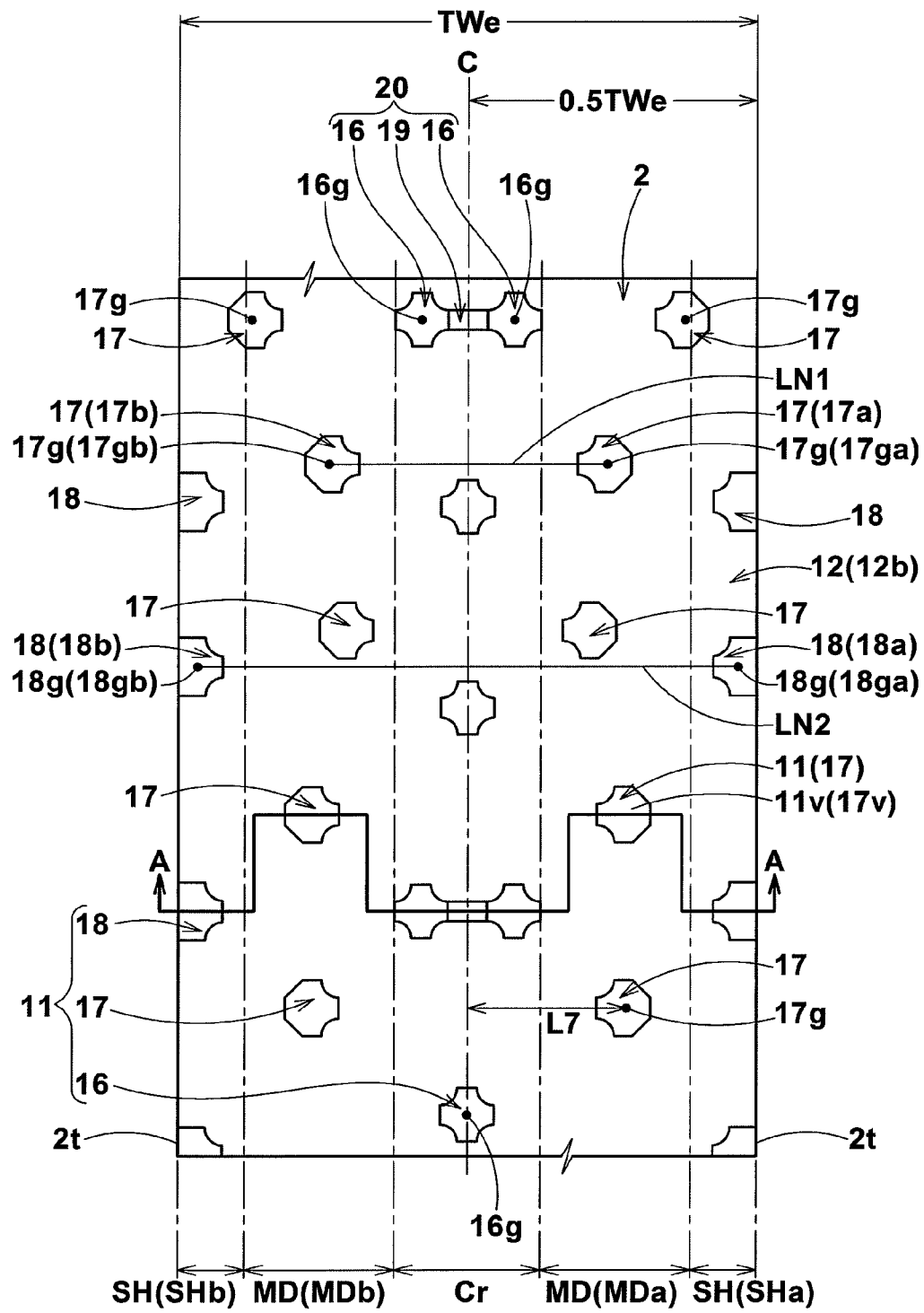
FIG. 2 is a developed plan view of the tread portion thereof.

The tread portion 2 is provided with a plurality of blocks 11 arranged sparsely as shown in FIG. 2, and in this embodiment, the land ratio (SL/s) is set in a range of not more than 30%, preferably not more than 26%, but not less than 6%, preferably not less than 10% in order to increase the digging of the blocks into the soft ground and thereby to produce a large drive power, but not to trap the mud and the like between the blocks. Incidentally, the land ratio (SL/s) is as well known in the art, a ratio of the ground contacting area SL (or the total area of the top surfaces of the blocks 11) to the gross area of the tread portion 2.

If the land ratio SL/s becomes more than 30%, then the ground pressure of the block 11 decreases, and there is a possibility that the digging into the ground becomes insufficient. If the land ratio SL/s becomes less than 6%, then the edges of the blocks 11 decrease, and there is a possibility that sufficient drive power can not be obtained.

As shown in FIG. 1, the bottom 12b of the sea area of the tread portion 2 has a profile which is curved similarly to the profile of the outer surface of the carcass 6. Here, the sea area means the area surrounding the blocks 11 and corresponding to the grooved area of the tread portion of a tire for passenger cars, truck/bus and the like.

In this embodiment, the depth D1 of the sea bottom 12b from the tread surface is set in a range of from 9 to 19 mm.

The block 11 protrudes from the sea bottom 12b and has a top surface having a centroid and defining a part of the tread surface. Accordingly, the depth D1 corresponds to the radial height of the block 11 from the sea bottom 12b to the top surface. If the radial height D1 is less than 9 mm, the digging of the block 11 into the ground becomes decreased, and there is a possibility that sufficient drive power can not be obtained. If the radial height D1 is more than 16 mm, the rigidity of the block 11 decreases, and there is a possibility that sufficient drive power can not be obtained. From this standpoint, the radial height D1 is preferably not less than 10 mm and not more than 15 mm.

The hardness of the rubber of the block 11 is preferably set in a range of not less than 55 degrees, more preferably not less than 65 degrees, but not more than 95 degrees, more preferably not more than 85 degrees. Here, the hardness means a JIS type A durometer hardness measured at 23 deg.C.

If the hardness of the rubber is less than 55 degrees, it becomes difficult for the block 11 to secure sufficient rigidity, and there is a possibility that sufficient drive power can not be obtained. If the hardness of the rubber is more than 95 degrees, it becomes difficult for the block 11 to provide necessarily flexibility.

The above-mentioned blocks 11 are:
center blocks 16 whose centroids 16g of their top surfaces 16v are within a center region Cr of the tread portion 2;
middle blocks 17 whose centroids 17g of their top surfaces 17v are within a pair of middle regions MD of the tread portion 2; and shoulder blocks 18 whose centroids 18g of their top surfaces 18v are within a pair of shoulder regions SH of the tread portion 2.

Here, the center region Cr is defined as being centered on the tire equator c and having a developed width of 25% of the developed tread width Twe.

The shoulder regions SH are each defined as extending from the tread edge 2t toward the tire equator and having a developed width of 12.5% of the developed tread width TWe.

The middle regions MD are defined between the center region Cr and the shoulder regions SH as each having a developed width of 25% of the developed tread width TWe.

Figure 3:
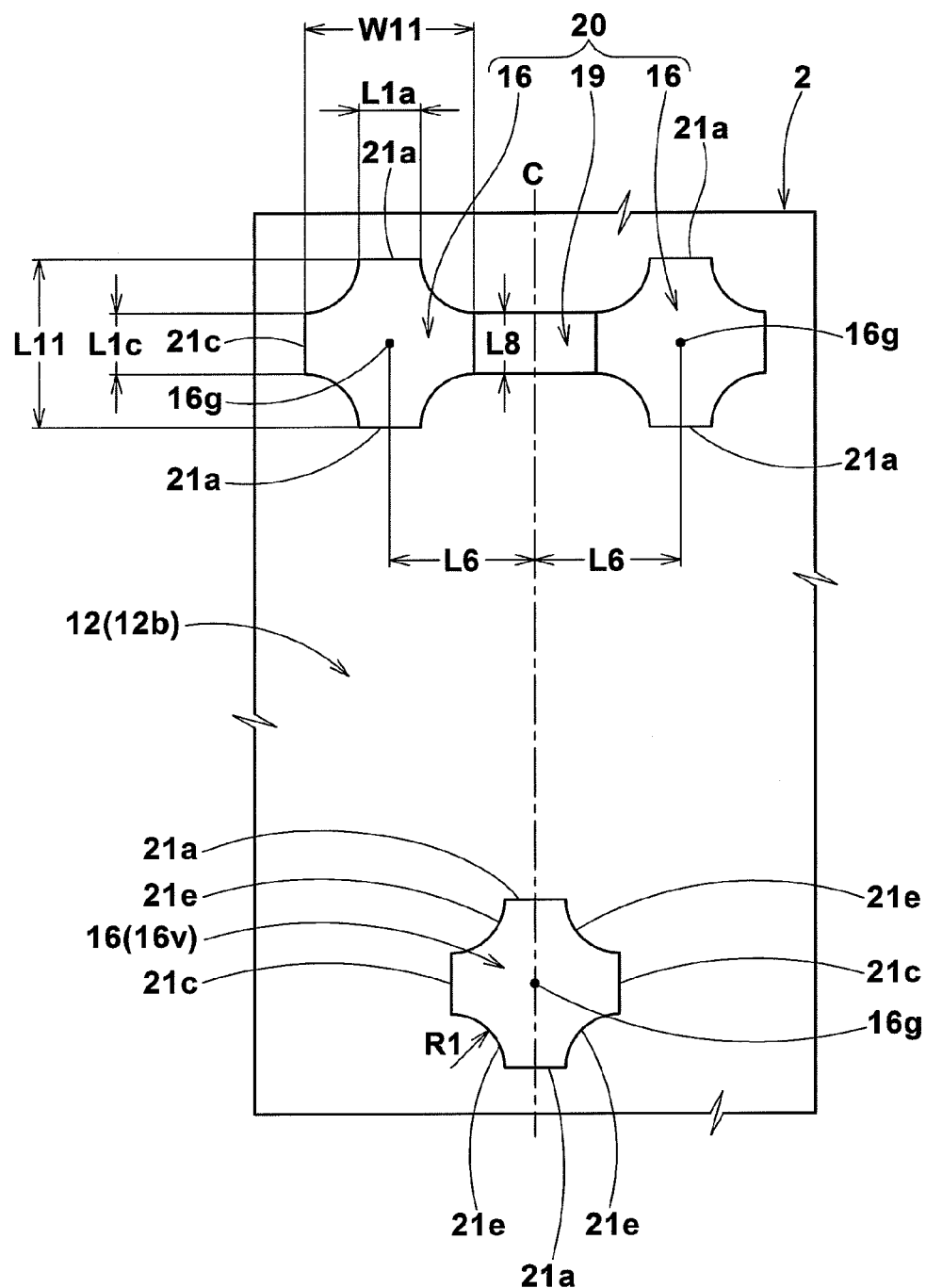
FIG. 3 is an enlarged view showing the center blocks thereof.

As shown in FIG. 3, the top surface 16v of the center block 16 is provided with a pair of axially extending edges 21a which extend straight and parallel with the tire axial direction on its both sides in the tire circumferential direction, and a pair of circumferentially extending edges 21c which extend straight and parallel with the tire circumferential direction on its both sides in the tire axial direction.

Further, the top surface 16v of the center block 16 is provided on both sides of each of the axially extending edges 21a in the tire axial direction with arc edges 21e curved convexly toward the centroid 16g of the center block 16 so that the axially extending edges 21a protrude oppositely in the tire circumferential direction and the circumferentially extending edges 21c protrude oppositely in the tire axial direction and thereby the top surface has a crisscross shape.

In this embodiment, the maximum axial width W11 and maximum circumferential length L11 of the top surface 16v of the center block 16 have substantially same values.

Such center block 16 is therefore, increased in the ground pressure on both sides in the tire circumferential direction of the axially extending edge 21a to dig into the ground further more during straight running. Accordingly, it is possible to improve the wandering, traction and braking performance during straight running.

Further, the center block 16 in this embodiment is increased in the ground pressure on both sides in the tire axial direction of the circumferentially extending edge 21c to dig into the ground deeply during cornering, therefore, it is also possible to improve cornering performance.

In order to effectively bring out such effects, the ratio L1a/W11 of the axial length L1 a of the axially extending edge 21a of the center block 16 and the maximum width W11 of the top surface 16v of the center block 16 is preferably set in a range of 26 to 46%.

If the ratio L1 a/W11 is more than 46%, it becomes difficult to significantly increase the ground pressure near the axially extending edge 21a. If the ratio L1 a/W11 is less than 26%, the block rigidity is decreased near the axially extending edge 21a, and it becomes difficult to dig into the ground sufficiently. From this standpoint, the ratio L1 a/W11 is more preferably not more than 41% and not less than 31%.

For similar reasons, the ratio L1 c/L11 of the circumferential length L1 c of the circumferentially extending edge 21c of the center block 16 and the maximum length L11 of the top surface 16v of the center block 16 is preferably set in a range of not more than 46%, more preferably not more than 41%, but not less than 26%, more preferably not less than 31%.

The ratio R1/L11 of the radius R1 of curvature of the arc edge 21e of the center block 16 and the maximum length L11 of the top surface 16v of the center block 16 is preferably set in a range of from 22 to 42%.

If the ratio R1/L11 is less than 22%, the lengths L1 a and L1 c of the axially extending edge 21a and circumferentially extending edge 21c excessively increase and the ground pressure can not be increased near the edges 21a and 21c. If the ratio R1/L11 is more than 42%, the block rigidity is excessively decreased near the edges 21a and 21c, and the digging into the ground becomes decreased. From this standpoint, the ratio R1/L11 is more preferably not less than 27% and not more than 37%.

In this embodiment, the center blocks 16 include, in addition to independent solo center blocks 16, a plurality of tied center block groups 20 each consisting of at least two, in this embodiment only two of the center blocks 16 which are arranged in line in the tire axial direction and each connected to the next with a tie bar 19 protruding from the sea bottom 12b and extending continuously therebetween.

By the tie bars 19, the tied center blocks 16 are increased in the apparent rigidity, and the traction and braking performance during straight running can be improved. Further, as the axially extending edges of the tie bars 19 are added, the traction and braking performance when running straight on soft grounds can be improved.

In order to effectively bring out such effects, the tied center block groups 20 are preferably arranged circumferentially of the tire at intervals so that during running at least one of the tied center block groups 20 always exists in the ground contacting patch (or footprint) of the tire under the normally inflated loaded condition. If the number of the tied center block groups 20 is too much, the land ratio (SL/s) increases, and the digging into the ground becomes insufficiently. From this standpoint, the number of the tied center block groups 20 existing in the ground contacting patch is not more than 4.

In the tied center block group 20 in this embodiment, the two center blocks 16 are disposed one on each side of the tire equator C so that their centroids (g) become at the same axial distances L6 from the tire equator c. Preferably, the distance L6 is set in a range of from 5 to 10% of the developed tread width TWe. Thereby, during straight running, the tied center blocks contact with the ground simultaneously, which can reduce an imbalanced reaction force which causes the wandering on the tire.

Preferably, the circumferential length L8 of the tie bar 19 is set to be the same as the length sic of the circumferentially extending edge 21c of the center block 16. The radial height H1 of the tie bar 19 from the sea bottom 12b is set in a range of from 10 to 50% of the height D1 of the block 11 in order to increase the ground pressure of the center block 16 near the axially extending edges 21a.

Figure 4:
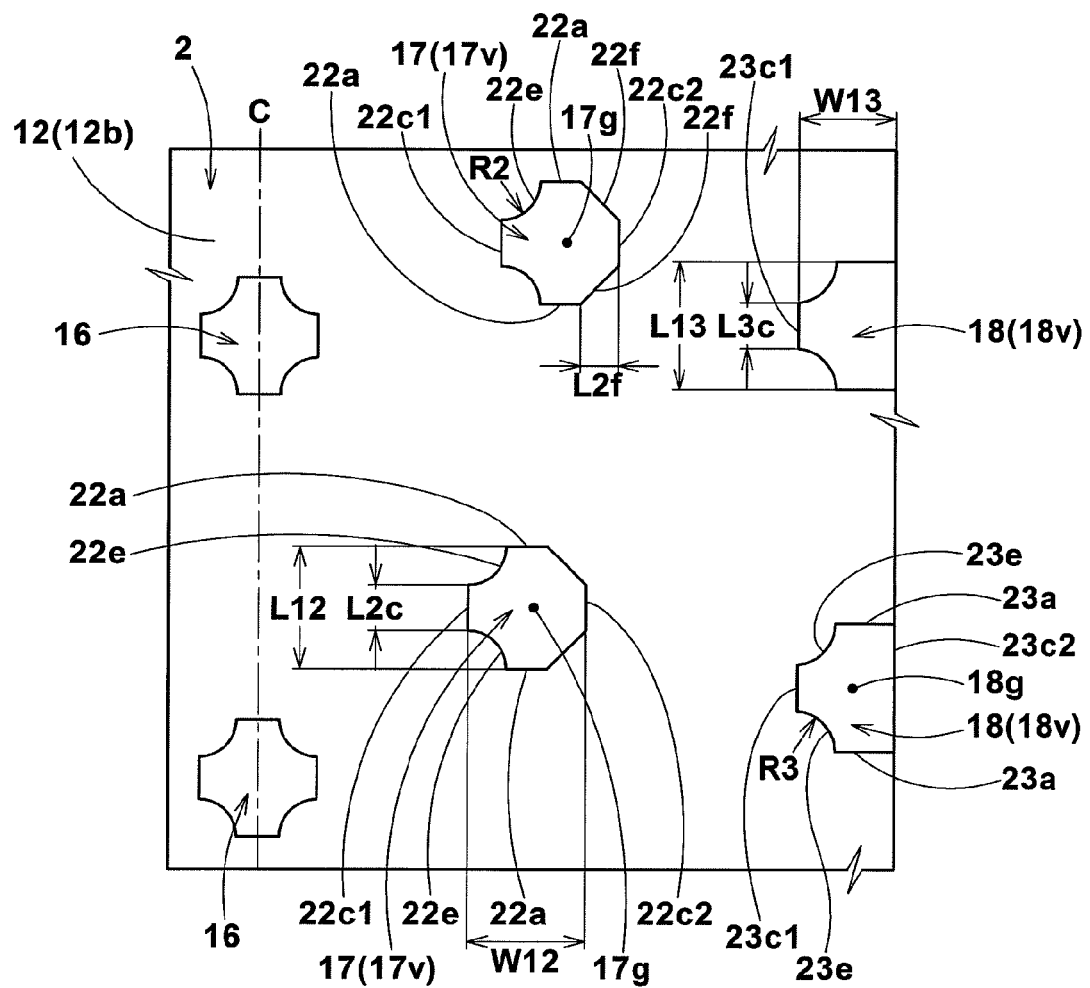
FIG. 4 is an enlarged view showing the middle blocks and shoulder blocks thereof.

As shown in FIG. 4, the top surface 17v of the middle block 17 is provided with an axially inside circumferentially extending edge 22c1 which extends straight and parallel with the tire circumferential direction on its tire equator side, an axially outside circumferentially extending edge 22c2 which extends straight and parallel with the tire circumferential direction on its axially outside, and a pair of axially extending edges 22a which extend straight and parallel with the tire axial direction on its both sides in the tire circumferential direction.

Further, the top surface 17v of the middle block 17 is provided on both sides of the axially inside circumferentially extending edge 22c1 in the tire circumferential direction with arc edges 22e curved convexly toward the centroid 17g.

Meanwhile, on both sides of the axially outside circumferentially extending edge 22c2 of the middle block 17 in the tire circumferential direction, oblique edges 22f extending straight and obliquely with respect to the tire circumferential direction are provided. This is preferable to the arc edges in order to maintain the rigidity of the middle block 17 at a higher level than the center block. The axial length 2 f of the oblique edge 22f is preferably set in a range of from 25 to 35% of the maximum width W12 of the top surface 17v of the middle block 17.

Thus, the axially inside circumferentially extending edge 22c1 protrudes toward the tire equator, and the top surface 17v of the middle block 17 has a T-shape.

In the middle block 17 in this embodiment, the maximum axial width W12 and maximum circumferential length L12 of the top surface 17v of the middle block 17 have substantially same values.

Such middle block 17 can increase the ground pressure of the top surface 17v near the axially inside circumferentially extending edge 22c1, therefore the higher ground pressure part digs into the ground more during cornering and cornering performance can be improved.

In order to effectively bring out the above effects, the ratio L2c/L12 of the circumferential length L2c of the axially inside circumferentially extending edge 22c1 of the middle block 17 and the maximum length L12 of the top surface 17v of the middle block 17 is preferably set in a range of from 27 to 47%. If the ratio L2c/L12 is more than 47%, it becomes difficult to increase the ground pressure near the axially inside circumferentially extending edge 22c1. If the ratio L2c/L12 is less than 27%, the block rigidity is excessively decreased near the axially inside circumferentially extending edge 22c1. From this standpoint, the ratio L2c/L12 is more preferably not more than 42% and not less than 32%.

For similarly reasons, the ratio R2/W12 of the radius R2 of curvature of the arc edge 22e of the middle block 17 and the maximum width W12 of the top surface 17v of the middle block 17 is preferably set in a range of not less than 22%, more preferably not less than 27%, but not more than 42%, more preferably not more than 37%.

It is preferable that in each of the middle regions MD, the centroids 17g of the middle blocks 17 which are arranged circumferentially of the tire are disposed at two or more different axial positions as shown in FIG. 2 in order to improve transient characteristics from straight running to cornering or vice versa.

In order to effectively bring out such effects, each of the centroids 17g of the middle blocks 17 in each of the middle regions MD is preferably disposed at a different axial position than those of the circumferentially adjacent centroids 17g.

Figure 5:
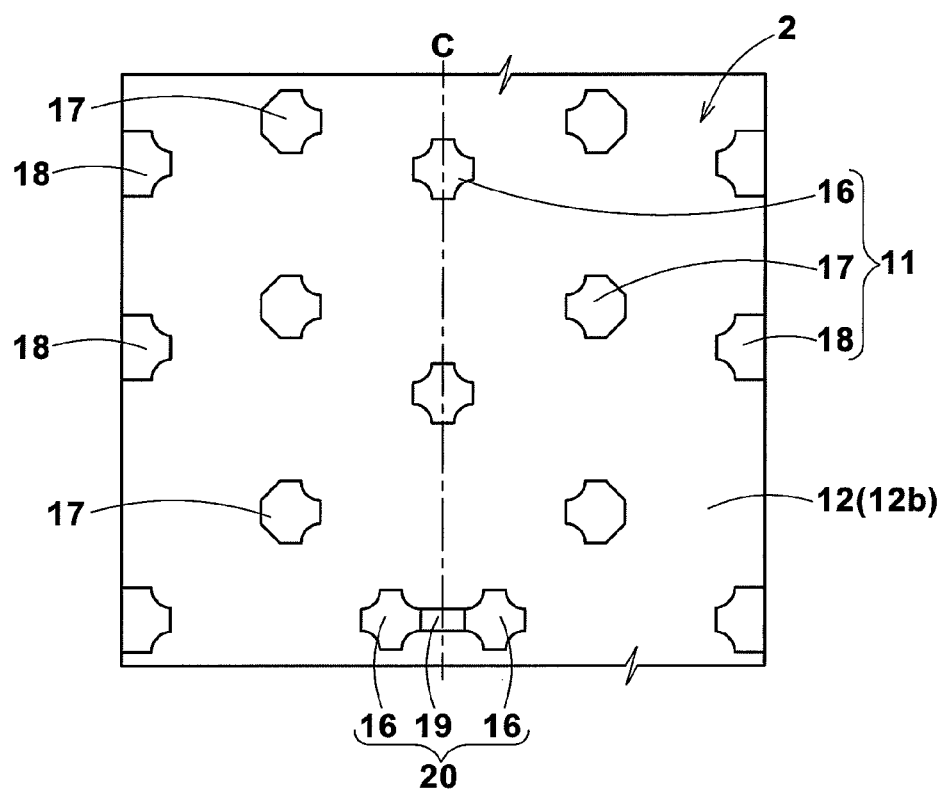
FIG. 5 is a developed plan view of the tread portion of a motorcycle tire for running on rough terrain according to another embodiment of the present invention.
Figure 6:
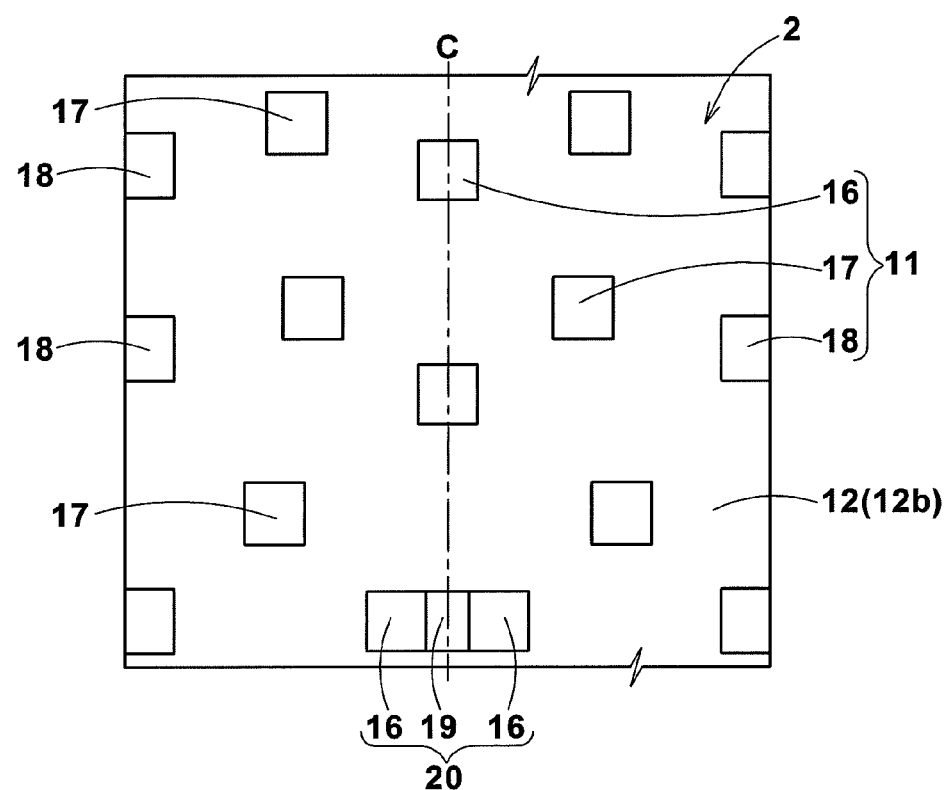
FIG. 6 is a developed plan view of a tread portion of a motorcycle tire used in the undermentioned comparison test as a reference tire in which the arrangement of the blocks are the same as FIG. 2 but the top surfaces of the blocks were conventional rectangular shapes.

However, as shown in FIG. 5, it is also possible that the middle blocks are arranged in line in the tire circumferential direction, or the centroids 17g of the middle blocks 17 in each of the middle regions MD are disposed at the same axial position.

In any case, the ratio L7/0.5 TWe of the axial distance L7 from the tire equator C to the centroid 17g of the middle block 17 and one half of the developed tread width 0.5 TWe is preferably set in a range of not less than 38%, more preferably not less than 48%, but not more than 68%.

If the ratio L7/0.5 TWe is less than 38%, it becomes difficult for the middle blocks 17 to make a contribution to improvement in the grip performance in full bank cornering. If the ratio L7/0.5 TWe is more than 68%, it becomes difficult for the middle blocks 17 to make a contribution to improvement in the grip performance in straight running and the transient state between straight running and cornering.

In the middle blocks 17 in this embodiment, with respect to the circumferential positions of the centroids, the middle blocks 17a in one middle region ma are respectively aligned with the middle blocks 17b in the other middle region MDb so that the angle of a straight line LN1 drawn between the centroids 17ga and 17gb of every two aligned middle blocks 17a and 17b becomes not more than 10 degrees, preferably not more than 5 degrees, most preferably 0 degree with respect to the tire axial direction. Therefore, the middle block 17a and middle block 17b can contact with the ground simultaneously to prevent wandering.

As shown in FIG. 4, the top surface 18v of the shoulder block 18 is provided with a pair of axially extending edges 23a which extend straight and parallel with the tire axial direction on its both sides in the tire circumferential direction, an axially inside circumferentially extending edge 23c1 which extends straight and parallel with the tire circumferential direction on its tire equator side, an axially outside circumferentially extending edge 23c2 which extends straight and parallel with the tire circumferential direction on its axially outside, and a pair of arc edges 23e which are curved convexly toward the centroid on both sides of the axially inside circumferentially extending edge 23c1 in the tire circumferential direction.

But, differently from the middle block 17, the oblique edge 22f in the middle block 17 is not provided in order to increase the rigidity of the shoulder block 18 than the middle block 17. The axially inside circumferentially extending edge 23c1 protrudes toward the tire equator, and the top surface 18v of the shoulder block 18 has a T shape.

In this embodiment, the shoulder block 18 is formed such that the maximum circumferential length L13 of the top surface 18v is more than (about 110 to 140%) the maximum axial width W13 of the top surface 18v.

Therefor, during cornering, the ground pressure of the shoulder block 18 is increased near the axially inside circumferentially extending edge 23c1, and this part digs into the ground more to improve the cornering performance.

In order to effectively derive this advantage, the ratio L3c/L13 of the circumferential length L3c of the axially inside circumferentially extending edge 23c1 of the shoulder block 18 and the maximum length L13 of the top surface 18v of the shoulder block 18 is preferably set in a range of not more than 46%, more preferably not more than 41%, but not less than 26%, more preferably not less than 31%.

Further, the ratio R3/W13 of the radius R3 of curvature of the arc edge 23e of the shoulder block 18 and the maximum width W13 of the top surface 18v of the shoulder block 18 is preferably set in a range of not less than 29%, more preferably not less than 34%, but not more than 49%, more preferably not more than 44%.

In the shoulder blocks 18 in this embodiment, with respect to the circumferential positions of the centroids, the shoulder blocks 18a in one shoulder region sHa are respectively aligned with the shoulder blocks 18b in the other shoulder region sHb so that the angle of a straight line LN2 drawn between the centroids 18g1 and 18g2 of every two aligned shoulder blocks 18a and 18b becomes not more than 8 degrees, preferably not more than 4 degrees, most preferably 0 degree with respect to the tire axial direction. Therefore, the shoulder block 18a and shoulder block 18b can contact with the ground simultaneously when running on soft ground or when running under a low tire pressure condition and thereby wandering can be prevented.

Further, in this embodiment, as shown in FIG. 2, the tied center block groups 20 each consists of two center blocks 16 arranged such that the circumferentially extending edges 21c of the center blocks 16 are aligned with the border lines of the tread center region Cr. In other words, the groups 20 extends over the entire width of the tread center region Cr. Between the circumferentially adjacent groups 20, two solo center blocks 16 are disposed on the tire equator C.

The solo center blocks 16 and the groups 20 are disposed at substantially even intervals in the tire circumferential direction.

The middle blocks 17 in each middle region MD are disposed at four different axial positions.

The axially outermost middle blocks 17 are aligned with every two groups 20 with respect to the circumferential positions. Between the circumferentially adjacent groups 20, three middle blocks 17 are disposed at three different axial positions.

As a result, the middle blocks 17 in each middle region MD are disposed along a wavy line.

The shoulder blocks 18 are disposed along the tread edges. The shoulder blocks 18 in each shoulder region SH are those aligned with every two groups 20 which are not aligned with the axially outermost middle blocks 17, and two shoulder blocks disposed between every two circumferentially adjacent groups 20.

Further, in this embodiment, from the top surface to the bottom of each block, cross sections of the block parallel to the top surface are gradually increased in the area, having similar figures to the top surface. The increase in the area is linear from the top surface to a radial height of about 15 to 20% of the radial height D1, then the increase is at an accelerated rate to the sea bottom.

The maximum width W11 of the top surface 16v of the center block 16 is about one third (30 to 36%) of the developed width of the center region cr. The maximum width W12 of the top surface 17v of the middle block 17 is substantially same as the maximum width W11 of the center block 16. The maximum axial width W13 of the top surface 18v of the shoulder block 18 is substantially same as or slightly smaller than (100 to 80%) the maximum width W11 of the center block 16.

All of the blocks have almost same sizes such that the maximum top surface area is less than 150% of the minimum top surface area.

Comparison Tests

Test tires having the internal structure shown in FIG. 1 and blocks whose specifications are shown in Table 1 were experimentally manufactured and tested.

In the test, 450 cc motorcycle for motocross race provided on the front wheel with the test tire (tire pressure: front 80 kPa) was run on a rough terrain for tire testing, and the traction and braking performance during straight running and cornering performance were evaluated by the test rider into ten ranks based on comparative example tire Ref. 1 being rank 5. The larger the rank number, the better the performance.

The Results are Shown in Table 1.

Common Specifications are as Follows:
  front tire size: 80/100-21 (rim size: 1.60×21)
  axial tread width TW: 97 mm
  developed tread width TWe: 118.72 mm
  land ratio SL/S: 10%
  block height D1: 15 mm
  center block:
    maximum width W11: 11 mm,
    maximum length L11: 11 mm
  middle block:
    maximum width W12: 11 mm,
    maximum length L12: 11 mm
  shoulder block:
    maximum width W13: 9 mm,
    maximum length L13: 11 mm
  tied center block groups:
    distance L6: 9.5 mm (8% of TWe)
    tie bar length L8: 3.5 mm
    tie bar height H1: 3.5 mm (23.3% of D1)

From the test results, it was confirmed that, according to the invention, the traction and braking performance during straight running can be improved.

TABLE 1

| Tire | Ref. 1 | Ex. 1 | Ex. 2 | Ex. 3 | Ex. 4 | Ex. 5 | Ex. 6 |
|---|---|---|---|---|---|---|---|
| Tread pattern (Fig. No.) | 6 | 2 | 2 | 2 | 2 | 2 | 2 |
| Length L1a(mm) | — | 3.96 | 5.06 | 2.86 | 3.96 | 3.96 | 3.96 |
| L1a/W11(%) | — | 36 | 46 | 26 | 36 | 36 | 36 |
| Length L1c(mm) | — | 3.96 | 3.96 | 3.96 | 5.06 | 2.86 | 3.96 |
| L1c/L11(%) | — | 36 | 36 | 36 | 46 | 26 | 36 |
| Radius R1 (mm) | — | 3.52 | 3.52 | 3.52 | 3.52 | 3.52 | 2.42 |
| R1/L11(%) | — | 32 | 32 | 32 | 32 | 32 | 22 |
| Length L2c (mm) | — | 4.07 | 4.07 | 4.07 | 4.07 | 4.07 | 4.07 |
| L2c/L12(%) | — | 37 | 37 | 37 | 37 | 37 | 37 |
| Radius R2 (mm) | — | 3.52 | 3.52 | 3.52 | 3.52 | 3.52 | 3.52 |
| R2/W12(%) | — | 32 | 32 | 32 | 32 | 32 | 32 |
| Length L3c (mm) | — | 3.96 | 3.96 | 3.96 | 3.96 | 3.96 | 3.96 |
| L3c/L13(%) | — | 36 | 36 | 36 | 36 | 36 | 36 |
| Radius R3 (mm) | — | 3.51 | 3.51 | 3.51 | 3.51 | 3.51 | 3.51 |
| R3/W13(%) | — | 39 | 39 | 39 | 39 | 39 | 39 |
| Line LN1 angle (deg.) | 0 | 0 | 0 | 0 | 0 | 0 | 0 |
| Line LN2 angle (deg.) | 0 | 0 | 0 | 0 | 0 | 0 | 0 |
| Block rubber hardness (deg.) | 75 | 75 | 75 | 75 | 75 | 75 | 75 |
| Tied center blocks groups exist ? | yes | yes | yes | yes | yes | yes | yes |
| number of groups in footprint | — | 2 | 2 | 2 | 2 | 2 | 2 |
| Distance L7 (mm) | — | 26/30/34/44.5 | " | " | " | " | " |
| L7/0.5TWe (%) | — | 44/50.5/57/75 | " | " | " | " | " |
| Traction | 5 | 10 | 7 | 7 | 9 | 8 | 7 |
| Braking performance | 5 | 10 | 7 | 7 | 9 | 8 | 7 |
| Cornering performance | 5 | 10 | 9 | 9 | 7 | 7 | 9 |

| Tire | Ex. 7 | Ex. 8 | Ex. 9 | Ex. 10 | Ex. 11 | Ex. 12 | Ex. 13 |
|---|---|---|---|---|---|---|---|
| Tread pattern (Fig. No.) | 2 | 2 | 2 | 2 | 2 | 2 | 2 |
| Length L1a(mm) | 3.96 | 3.96 | 3.96 | 3.96 | 3.96 | 3.96 | 3.96 |
| L1a/W11(%) | 36 | 36 | 36 | 36 | 36 | 36 | 36 |

TABLE 1-continued

| | | | | | | | |
|---|---|---|---|---|---|---|---|
| Length L1c(mm) | 3.96 | 3.96 | 3.96 | 3.96 | 3.96 | 3.96 | 3.96 |
| L1c/L11(%) | 36 | 36 | 36 | 36 | 36 | 36 | 36 |
| Radius R1 (mm) | 4.62 | 3.52 | 3.52 | 3.52 | 3.52 | 3.52 | 3.52 |
| R1/L11(%) | 42 | 32 | 32 | 32 | 32 | 32 | 32 |
| Length L2c (mm) | 4.07 | 5.17 | 2.97 | 4.07 | 4.07 | 4.07 | 4.07 |
| L2c/L12(%) | 37 | 47 | 27 | 37 | 37 | 37 | 37 |
| Radius R2 (mm) | 3.52 | 3.52 | 3.52 | 2.42 | 4.62 | 3.52 | 3.52 |
| R2/W12(%) | 32 | 32 | 32 | 22 | 42 | 32 | 32 |
| Length L3c (mm) | 3.96 | 3.96 | 3.96 | 3.96 | 3.96 | 5.06 | 2.86 |
| L3c/L13(%) | 36 | 36 | 36 | 36 | 36 | 46 | 26 |
| Radius R3 (mm) | 3.51 | 3.51 | 3.51 | 3.51 | 3.51 | 3.51 | 4.41 |
| R3/W13(%) | 39 | 39 | 39 | 39 | 39 | 39 | 49 |
| Line LN1 angle (deg.) | 0 | 0 | 0 | 0 | 0 | 0 | 0 |
| Line LN2 angle (deg.) | 0 | 0 | 0 | 0 | 0 | 0 | 0 |
| Block rubber hardness (deg.) | 75 | 75 | 75 | 75 | 75 | 75 | 75 |
| Tied center blocks groups exist ? | yes | yes | yes | yes | yes | yes | yes |
| number of groups in footprint | 2 | 2 | 2 | 2 | 2 | 2 | 2 |
| Distance L7 (mm) | 26/30/34/44.5 | " | " | " | " | " | " |
| L7/0.5TWe (%) | 44/50.5/57/75 | " | " | " | " | " | " |
| Traction | 7 | 8 | 9 | 8 | 9 | 10 | 8 |
| Braking performance | 7 | 8 | 9 | 8 | 9 | 10 | 8 |
| Cornering performance | 9 | 7 | 7 | 7 | 7 | 8 | 7 |

| Tire | Ex. 14 | Ex. 15 | Ex. 16 | Ex. 17 | Ex. 18 | Ex. 19 |
|---|---|---|---|---|---|---|
| Tread pattern (Fig. No.) | 2 | 2 | 2 | 5 | 2 | 2 |
| Length L1a(mm) | 3.96 | 3.96 | 3.96 | 3.96 | 3.96 | 3.96 |
| L1a/W11(%) | 36 | 36 | 36 | 36 | 36 | 36 |
| Length L1c(mm) | 3.96 | 3.96 | 3.96 | 3.96 | 3.96 | 3.96 |
| L1c/L11(%) | 36 | 36 | 36 | 36 | 36 | 36 |
| Radius R1 (mm) | 3.52 | 3.52 | 3.52 | 3.52 | 3.52 | 3.52 |
| R1/L11(%) | 32 | 32 | 32 | 32 | 32 | 32 |
| Length L2c (mm) | 4.07 | 4.07 | 4.07 | 4.07 | 4.07 | 4.07 |
| L2c/L12(%) | 37 | 37 | 37 | 37 | 37 | 37 |
| Radius R2 (mm) | 3.52 | 3.52 | 3.52 | 3.52 | 3.52 | 3.52 |
| R2/W12(%) | 32 | 32 | 32 | 32 | 32 | 32 |
| Length L3c (mm) | 3.96 | 3.96 | 3.96 | 3.96 | 3.96 | 3.96 |
| L3c/L13(%) | 36 | 36 | 36 | 36 | 36 | 36 |
| Radius R3 (mm) | 2.61 | 3.51 | 3.51 | 3.51 | 3.51 | 3.51 |
| R3/W13(%) | 29 | 39 | 39 | 39 | 39 | 39 |
| Line LN1 angle (deg.) | 0 | 10 | 10 | 0 | 0 | 0 |
| Line LN2 angle (deg.) | 0 | 8 | 0 | 0 | 0 | 0 |
| Block rubber hardness (deg.) | 75 | 75 | 75 | 75 | 55 | 95 |
| Tied center blocks groups exist ? | yes | yes | yes | yes | yes | yes |
| number of groups in footprint | 2 | 2 | 2 | 2 | 2 | 2 |
| Distance L7 (mm) | 26/30/34/44.5 | " | " | 30 | 26/30/34/44.5 | " |
| L7/0.5TWe (%) | 44/50.5/57/75 | " | " | 50.5 | 44/50.5/57/75 | " |
| Traction | 10 | 6 | 8 | 10 | 7 | 7 |
| Braking performance | 10 | 6 | 9 | 10 | 7 | 7 |
| Cornering performance | 8 | 6 | 10 | 8 | 7 | 7 |

| Tire | Ex. 20 | Ex. 21 | Ex. 22 | Ex. 23 | Ex. 24 |
|---|---|---|---|---|---|
| Tread pattern (Fig. No.) | 2 | 2 | 2 | 2 | 2 |
| Length L1a(mm) | 3.96 | 3.96 | 3.96 | 3.96 | 3.96 |
| L1a/W11(%) | 36 | 36 | 36 | 36 | 36 |
| Length L1c(mm) | 3.96 | 3.96 | 3.96 | 3.96 | 3.96 |
| L1c/L11(%) | 36 | 36 | 36 | 36 | 36 |
| Radius R1 (mm) | 3.52 | 3.52 | 3.52 | 3.52 | 3.52 |
| R1/L11(%) | 32 | 32 | 32 | 32 | 32 |
| Length L2c (mm) | 4.07 | 4.07 | 4.07 | 4.07 | 4.07 |
| L2c/L12(%) | 37 | 37 | 37 | 37 | 37 |
| Radius R2 (mm) | 3.52 | 3.52 | 3.52 | 3.52 | 3.52 |
| R2/W12(%) | 32 | 32 | 32 | 32 | 32 |
| Length L3c (mm) | 3.96 | 3.96 | 3.96 | 3.96 | 3.96 |
| L3c/L13(%) | 36 | 36 | 36 | 36 | 36 |
| Radius R3 (mm) | 3.51 | 3.51 | 3.51 | 3.51 | 3.51 |
| R3/W13(%) | 39 | 39 | 39 | 39 | 39 |
| Line LN1 angle (deg.) | 0 | 0 | 0 | 0 | 0 |
| Line LN2 angle (deg.) | 0 | 0 | 0 | 0 | 0 |
| Block rubber hardness (deg.) | 75 | 75 | 75 | 75 | 75 |
| Tied center blocks groups exist ? | no | yes | yes | yes | yes |
| number of groups in footprint | — | 1 | 4 | 2 | 2 |
| Distance L7 (mm) | 26/30/34/44.5 | " | " | 22.5/26.5/30.5/44.5 | 32.5/36.5/40.5/44.5 |
| L7/0.5TWe (%) | 44/50.5/57/75 | " | " | 38/44/51/75 | 55/61/68/75 |
| Traction | 8 | 9 | 8 | 9 | 8 |
| Braking performance | 8 | 9 | 8 | 9 | 8 |
| Cornering performance | 10 | 10 | 8 | 7 | 7 |

The invention claimed is:

1. A motorcycle tire for running on rough terrain comprising a tread portion provided with a plurality of blocks defining a block pattern, the blocks including center blocks whose centroids of their top surfaces are disposed within a center region of the tread portion defined as being centered on the tire equator and having a developed width of 25% of a developed tread width, wherein the top surface of each of the center blocks is provided with an axially extending edge which extends straight and parallel with the tire axial direction on its each side in the tire circumferential direction, and a pair of arc edges which are curved convexly toward the centroid of the top surface and disposed on both sides of the axially extending edge in the tire axial direction;

shoulder blocks whose centroids of their top surfaces are within shoulder regions defined as extending toward the tire equator from the respective tread edges and each having a developed width of 12.5% of the developed tread width, wherein the top surface of each of the shoulder blocks is provided with a pair of axially extending edges which extend straight and parallel with the tire axial direction on its both sides in the tire circumferential direction, an axially outside circumferentially extending edge which extends straight and parallel with the tire circumferential direction between the axially outer ends of the axially extending edges, an axially inside circumferentially extending edge which extends straight and parallel with the tire circumferential direction on its tire equator side; and a pair of arc edges which are curved convexly toward the centroid on both sides of the axially inside circumferentially extending edge in the tire circumferential direction; and middle blocks whose centroids of their top surfaces are within middle regions of the tread portion defined between the center region and the shoulder regions, wherein the top surface of each of the middle blocks is provided with an axially inside circumferentially extending edge which extends straight and parallel with the tire circumferential direction on its tire equator side, an axially outside circumferentially extending edge which extends straight and parallel with the tire circumferential direction on its axially outside a pair of axially extending edges which extend straight and parallel with the tire axial direction on its both sides in the tire circumferential direction, a pair of arc edges which are curved convexly toward the centroid on both sides of the axially inside circumferentially extending edge in the tire circumferential direction, and a pair of oblique edges extending straight and obliquely with respect to the tire circumferential direction on both sides of the axially outside circumferentially extending edge in the tire circumferential direction.

2. The motorcycle tire for running on rough terrain according to claim 1, wherein in each of the center blocks, the axial length of the axially extending edge is 26 to 46% of the maximum axial width of the top surface, and the arc edges each have a radius of curvature which is 22 to 42% of the maximum circumferential length of the top surface.

3. The motorcycle tire for running on rough terrain according to claim 1 or 2, wherein
said center blocks include a plurality of tied center block groups each consisting of at least two axially arranged center blocks each connected to the next with a tie bar, and
the tied center block groups are arranged circumferentially of the tire at intervals so that at least one group always exists in the ground contacting patch of the tire during running.

4. The motorcycle tire for running on rough terrain according to claim 1, wherein
the circumferential length of the axially inside circumferentially extending edge of the middle block is 27 to 47% of the maximum circumferential length of the top surface of the middle block, and
the arc edges of the middle block each have a radius of curvature of 22 to 42% of the maximum axial width of the top surface of the middle block.

5. The motorcycle tire for running on rough terrain according to claims 1 or 4, wherein
the middle blocks in each said middle region are arranged circumferentially of the tire so that their centroids are disposed at at least two different axial positions.

6. The motorcycle tire for running on rough terrain according to claim 1, wherein
the axial distance from the tire equator to the centroid of each said middle block is 38 to 68% of one half of the developed tread width.

7. The motorcycle tire for running on rough terrain according to claim 1, wherein
with respect to the circumferential positions of the centroids of the middle blocks, the middle blocks in one of the middle regions are respectively aligned with the middle blocks in the other middle region so that the angle of a straight line drawn between the centroids of the aligned middle blocks is not more than 10 degrees with respect to the tire axial direction.

8. The motorcycle tire for running on rough terrain according to claim 1, wherein
the circumferential length of the axially inside circumferentially extending edge of the shoulder block is 26 to 46% of the maximum circumferential length of the top surface of the shoulder block, and
the arc edges of the shoulder blocks each have a radius of curvature of 29 to 49% of the maximum axial width of the top surface of the shoulder block.

9. The motorcycle tire for running on rough terrain according to claim 1, wherein
with respect to the circumferential positions of the centroids of the shoulder blocks, the shoulder blocks in one of the shoulder regions are respectively aligned with the shoulder blocks in the other shoulder region so that the angle of a straight line drawn between the centroids of the aligned shoulder blocks is not more than 8 degrees with respect to the tire axial direction.

10. The motorcycle tire of claim 1, wherein a land ratio of the top surface of the blocks to the gross area of the tread (SL/S) is 6-30%.

* * * * *